(12) United States Patent
Yamamoto et al.

(10) Patent No.: US 6,206,783 B1
(45) Date of Patent: Mar. 27, 2001

(54) CONTROL INPUT DEVICE AND GAME SYSTEM

(75) Inventors: Takeyasu Yamamoto; Masaki Uchida, both of Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/260,496

(22) Filed: Mar. 2, 1999

(30) Foreign Application Priority Data

Mar. 6, 1998 (JP) .................................................. 10-073119
Sep. 2, 1998 (JP) .................................................. 10-248051

(51) Int. Cl.$^7$ ................................ A63F 9/00; A63B 71/00
(52) U.S. Cl. ........................................ 463/36; 273/148 B
(58) Field of Search ................................ 273/317, 148 B, 273/438; 434/43, 20, 21, 69, 55, 16, 61–62, 67, 17, 307 R, 18, 247, 19, 36–39; 463/23, 43, 52, 47.2–47.5, 1, 2, 5, 49–57, 38; 364/468.01; 42/94; 345/156, 161, 184; 74/469, 471 R, 471 XY, 479.01

(56) References Cited

U.S. PATENT DOCUMENTS

| | | | | |
|---|---|---|---|---|
| 4,099,719 | * | 7/1978 | Dean et al. | 273/101.2 |
| 4,729,536 | * | 3/1988 | Scala | 248/429 |
| 4,964,503 | * | 10/1990 | Nishiyama et al. | 192/12 D |
| 5,146,557 | * | 9/1992 | Yamrom et al. | 395/161 |
| 5,190,286 | * | 3/1993 | Watanabe et al. | 273/85 G |
| 5,248,150 | * | 9/1993 | Koma | 463/5 |
| 5,370,536 | * | 12/1994 | Chuang | 434/62 |
| 5,589,828 | * | 12/1996 | Armstrong | 341/20 |
| 5,766,079 | * | 6/1998 | Kataoka et al. | 463/36 |
| 5,795,224 | * | 9/1998 | Yoshida | 463/2 |
| 5,872,575 | * | 2/1999 | Segal | 345/473 |
| 5,880,709 | * | 3/1999 | Itai et al. | 345/313 |
| 5,903,257 | * | 5/1999 | Nishiumi et al. | 345/157 |

FOREIGN PATENT DOCUMENTS

| | | | | |
|---|---|---|---|---|
| 6-24606 | * | 6/1994 | (JP) | 273/438 |
| 8-257240 | | 10/1996 | (JP) . | |

* cited by examiner

Primary Examiner—Mark Sager
(74) Attorney, Agent, or Firm—Oliff & Berridge, PLC

(57) ABSTRACT

A game system allows a player to move a character within a game space while the player manipulates a shooting device. The game system comprises a mobile mount that can be moved at least in the forward and backward, and rightward and leftward directions, and a gun rotatably mounted on the mount. The game system is responsive to the movement of the mobile mount for moving a character object in the forward and backward, and rightward and leftward directions within the game space, changing the facing direction of the character object depending on the rotational movement of the gun, and displaying a game image representing these actions on a display.

19 Claims, 18 Drawing Sheets

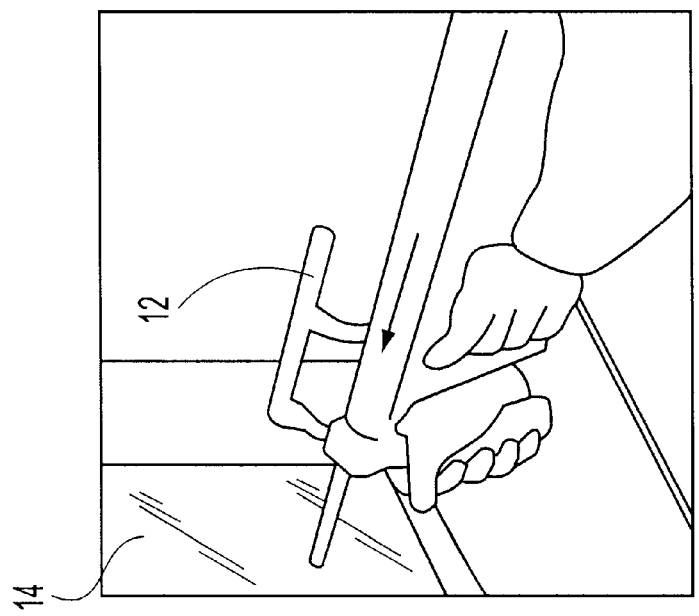
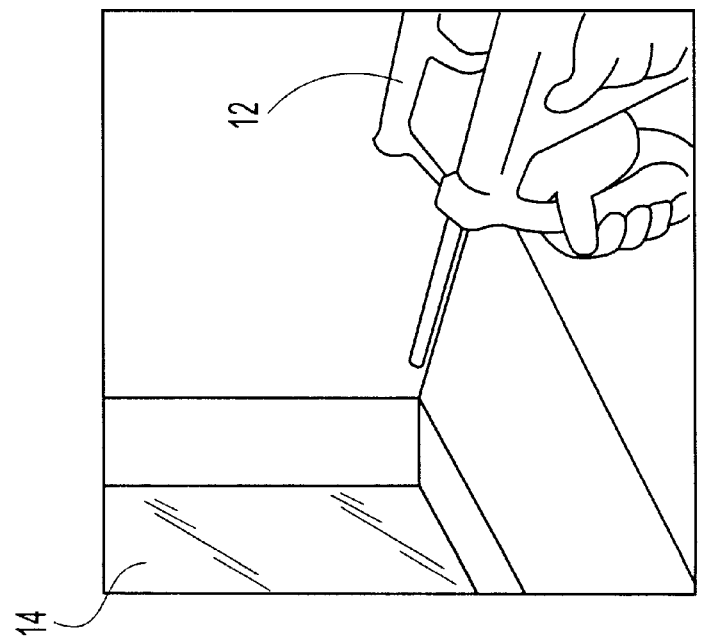
FIG. 8B
FIG. 8A

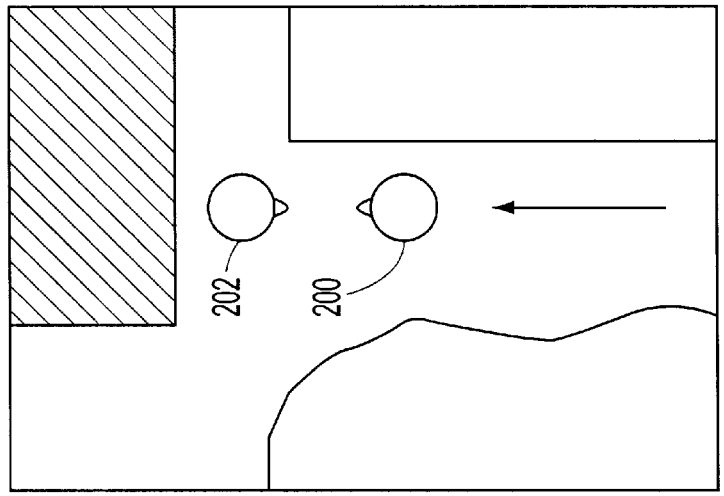
FIG. 9B
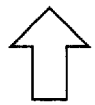
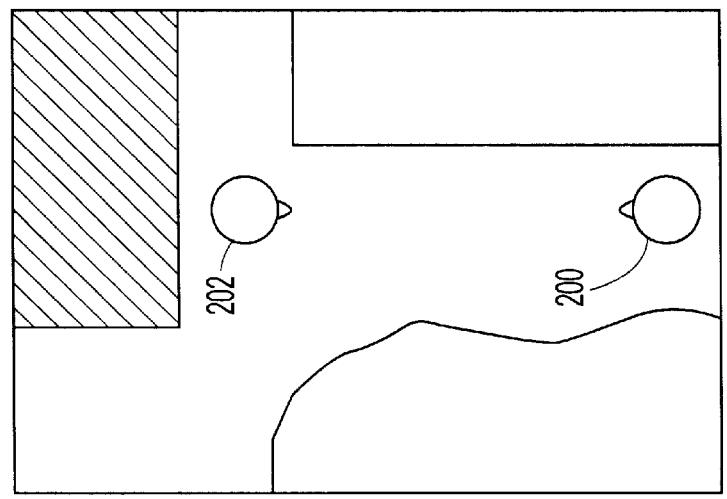
FIG. 9A

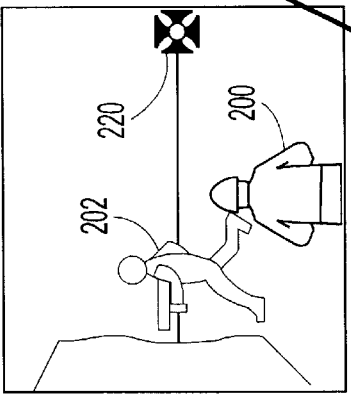
FIG. 14A
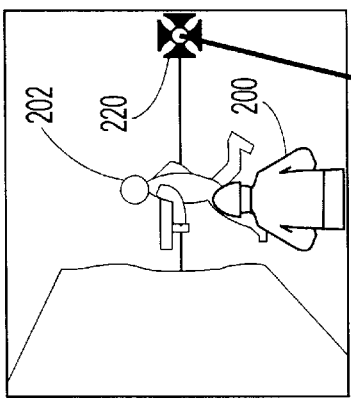
FIG. 14B
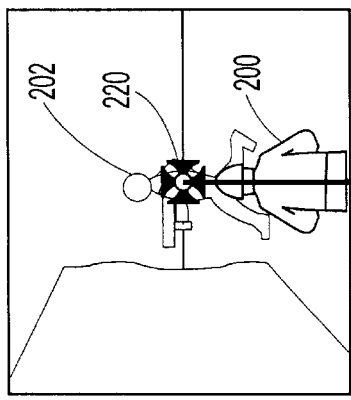
FIG. 14C
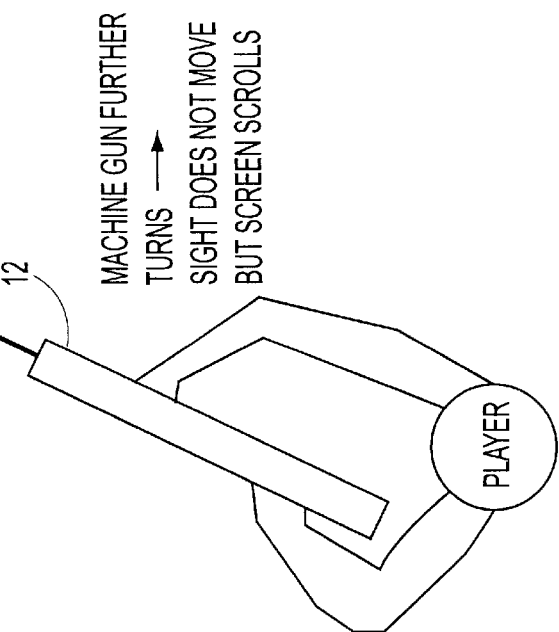
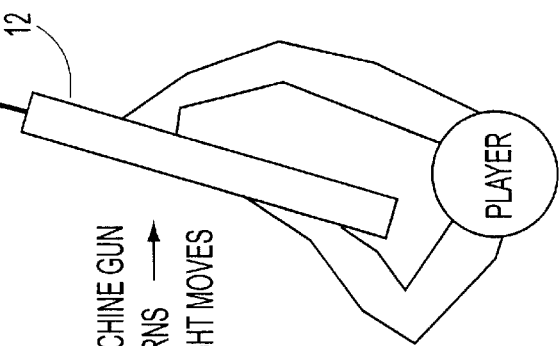
MACHINE GUN TURNS SIGHT MOVES
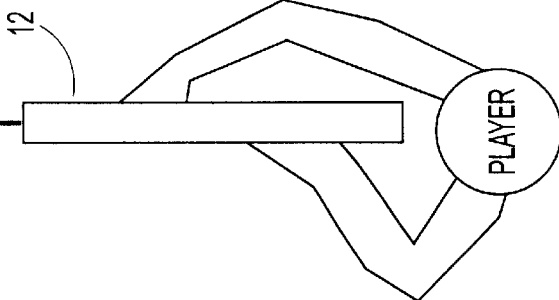
MACHINE GUN FURTHER TURNS SIGHT DOES NOT MOVE BUT SCREEN SCROLLS

CONTROL INPUT DEVICE AND GAME SYSTEM

BACKGROUND OF THE INVENTION

1. Field of Industrial Application

The present invention relates to a control input device and a game system and particularly to a control input device usable for inputting a manipulated variable into a simulation apparatus or the like and a game system for playing a game by moving a character within a game space through the input operation of a player.

2. Description of the Prior Art

Popular games are known to include a shooting game for shooting targets by the use of a shooting input section such as a mimic gun or the like, a fighting game for fighting enemies by the use of mimic guns and so on. During the game play, a player aims and triggers its own mimic gun at an enemy in an image on the screen. When the facing direction of the gun aligns with the position of the enemy, the enemy will be damaged.

Depending on the game, an enemy may shoot a player at the same time as the player shoots that enemy. At this time, the enemy is bullet comes out from the depth of the image toward the player. It is judged that the player is hit by the bullet as the bullet has moved to a position spaced apart from the player by a predetermined distance.

Japanese Patent Laid-open Application Hei 8-257240 discloses a game machine using a mimic gun swivelable about a fulcrum on a control panel. Such a gun is also movable in the lateral directions.

In such a game machine, however, the movement of the mimic gun for avoiding bullets from the enemy on the screen is limited since the gun is only movable in the lateral directions Thus, the game lacks in reality relating to that the player attacks the enemy while avoiding the attack from the enemy. In addition, the input operation through the mimic gun has less flexibility, so that much more time will be required to smash the enemy.

There is also a shooting game system in which a player character is moved within a game space by a player manipulating a character moving control section with one hand, the other hand being used to manipulate a mimic gun to aim at and shoot a target.

In such a shooting game system, it is very difficult that the player moves the character with one hand and manipulates the mimic gun with the other hand. Therefore, this shooting game system raised a problem in that the manipulation was too difficult for players and that any player could not concentrate on and enjoy the shooting game.

Particularly, any beginner cannot successfully manipulate the separate actions on both hands respectively Thus, the game is often over without enjoying it. As a result, the shooting game system will less be challenged by the beginner.

SUMMARY OF THE INVENTION

It is therefore an object of the present invention to provide a control input device using a shooting input section in the form of a mimic gun or the like, which can simulate a real shooting action and which can increase the flexibility to the input operation through the shooting input section.

Another object of the present invention is to provide a game system in which any player can enjoy a game by easily and simply moving a character within a game space.

Still another object of the present invention is to provide a game system in which any player can move a character within a game space while manipulating a shooting device without any difficulty, whereby all the players widely ranging from beginners to advanced players can enjoy the shooting game.

To this end, the present invention provide a control input device comprising:

a shooting input section disposed opposite to an image display section;

a moving section for moving the shooting input section in a two-dimensional direction relative to the image display section; and a detecting section for detecting the amount of movement of the shooting input section.

In such an arrangement, the image display section may be in the form of a CRT display. The shooting input section is one that is formed for directing a bullet to the desired direction and that can simulate a shooting action. For example, the shooting input section may be a mimic gun which is provided with a trigger or trigger lever.

The detecting section may be formed by a volume element or potentiometer having its variable resistance depending on the movement of the shooting input section. It is of course that the detecting section may be formed by any of the other different detecting elements.

Since the aforementioned control input device includes the shooting input section movable to any two-dimensional direction, the shooting action can be more realistically simulated with the increased flexibility in the input operation of the shooting input section, in comparison with the prior art device in which the shooting input section is only movable in the lateral directions.

It is desirable in the present invention that the shooting input section is mounted on the moving section so that the shooting input section can be rotated about an axis which is substantially perpendicular to the two-dimensional direction.

The shooting input section of the present invention preferably includes a rotational angle detecting section for detecting a rotational angle of the axial rotation of the shooting input section.

In such an arrangement, the shooting input section can be swiveled to direct its muzzle to any desired direction in addition to the two-dimensional movement of the shooting input section, thereby further increase the flexibility in the input operation. As a result, the game can further be improved in reality when the player attacks the enemy while avoiding the enemy's attack.

It is further preferable that the moving section comprises:

a first slide table supporting the shooting input section;

a second slide table supporting the first slide table for a movement in one direction; and a frame supporting the second slide table for a movement in a direction perpendicular to the one direction.

In such an arrangement, the parallel movement of the shooting input section on the two-dimensional plane can be accomplished by a simple and reliable structure.

It is further preferable that a stopper member is fixedly mounted on the first slide table, and one end of an elastic member is connected to the stopper member, and the other end of the elastic member is connected to the frame.

Thus, the player can feel the elastic restoring force from the elastic member as an appropriate feel of operation when the shooting input section is being operated by the player. When the player releases the control input device, secondly, the first slide table can be returned into its original position, whereby the output signal from the detecting section can be initialized to zero.

The elastic member is a member generating an elastic restoring force when deformed and may be formed by a spring or rubber.

The present invention also provides a game system comprising:

input means for moving a character, the input means being movable in at least both of a first direction and a second direction, the second direction being perpendicular to the first direction; and processor means for computing and displaying a game image in which at least one of a character and virtual camera is movable within a game space in the combined direction of the first and second directions, based on an input signal from the input means.

When a player moves the input means in the desired direction in which the character is to be moved, the player's character can agreeably be moved within the game space in the same direction as the input means is physically moved. Thus, the player can enjoy the game while moving the character within the game space in an easy and smooth manner.

It is preferable that the processor means computes the game space as a three-dimensional object space and to set the character as a player's character object movable within the object space.

Furthermore, the processor means may comprise:

character computation control means responsive to an input signal from the input means for controlling the character within the game space; and virtual camera computation control means responsive to the input signal from the input means for controlling the virtual camera within the game space.

It is further preferable in the present invention that the input means is disposed in front of a display showing a game image, the first direction being defined as a direction facing toward the display, the second direction being defined as a direction perpendicular to the first direction in a horizontal plane.

Thus, the player can enjoy the game while simply and easily moving the player's character within the game space in all the horizontal directions by moving the input means in the combined horizontal directions.

It is further preferably that the processor means computes a game image in which at least one of the character and a virtual camera moves in the second direction while facing toward the first direction, based on the input signal from the input means in the second direction.

This can make the motion of the player's character on the game image extremely natural for the player seeing the game image.

The game system of the present invention preferably comprises:

a moving body mounted on a machine base so as to be moved in both the first and a the second directions; and a shooting device provided on the moving body for aiming at and shooting a target displayed in the game image, and wherein the processor means changes the facing direction of at least one of the character and the virtual camera based on the facing direction of the shooting device.

In such an arrangement, the player can play the shooting game while moving the shooting device itself in the first and second directions. Thus, the movement of the character within the game space can be interlocked with the aiming action of the shooting device. Therefore, any player ranging from beginners to skilled players can enjoy the shooting game.

With the aforementioned feature, the player can move its own character within the game space with the real feeling that the player itself moves with the shooting device and can also aim and shoot a predetermined target through the shooting device. As a result, the present invention can provide a shooting game system in which the player easily enjoys the shooting game with its natural action.

It is further preferable that the shooting device is mounted on the moving body so that a facing direction thereof is variable, and the processor means causes at least one of the character and the virtual camera to face the same facing direction as the shooting device.

Thus, the player can enjoy the shooting game by easily changing the viewing angle thereof relative to the game space when the shooting device is manipulated while effectively searching a target that may exist in the game space.

The input means preferably includes means for applying a restoring force to return the input means to a given neutral point.

It is particularly preferable that the restoring force applying means returns the moving body to a given neutral position.

Thus, the player can more accurately perform the input operation since the input means will be returned to its neutral position at all times.

It is further preferable that the moving body comprises:

a first slide portion which slides on the machine base in any one of the first and the second directions; and a second slide portion which slides on the first slide portion in the other one of the first and the second directions, wherein the input means comprises means for applying a restoring force to return the first and the second slide portions to a given neutral point, and wherein the shooting device is mounted on the second slide portion.

Thus, the shooting action in the shooting device can be performed with the movement of the character through a more simplified structure of the input means.

The input means may be moved in a third direction perpendicular to the plane including the first and second directions and the processor means may move at least one of the character and virtual camera in all of the first, second and third directions.

BRIEF DESCRIPTION OF THE DRAWINGS

FIG. 6A illustrates the detection of a shooting device position while

FIG. 8 illustrates the control of the back-and-forth movement of the shooting device.

FIG. 9 illustrates the movement of the player's character object when the shooting device is moved back and forth.

FIG. 14 illustrates the player's character changed its facing direction when the facing direction of the shooting device is changed.

DESCRIPTION OF THE PREFERRED EMBODIMENTS

Some preferred embodiments of the present invention will now be described with reference to the drawings.

First Embodiment

Figure 18:
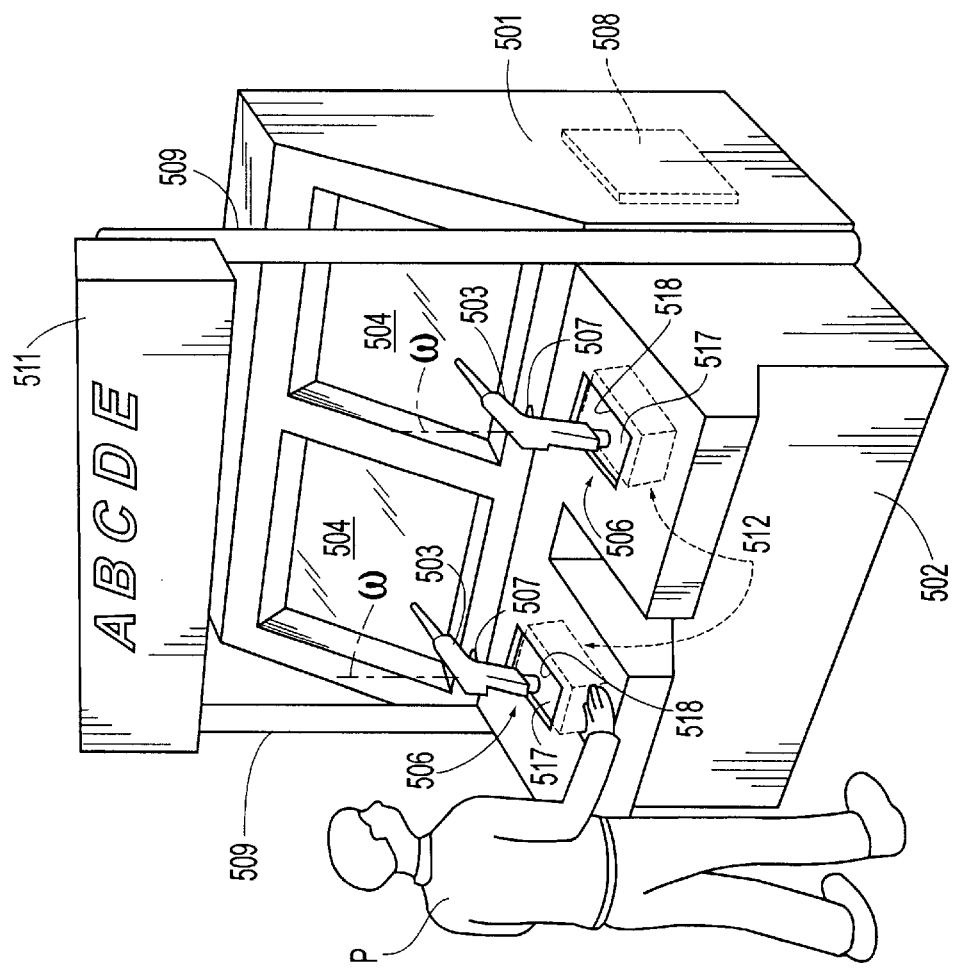
FIG. 18 is a perspective view of a game system structured by the use of the control input device shown in FIG. 17.

FIG. 18 shows a game system which is one embodiment of an image display device using a control input device according to the present invention.

The game system has a display housing 501 and a control housing 502. These housings are separately formed for individual transport and installation. The display housing 501 includes two CRT displays 504 used as image display sections, the screen thereof being externally exposed. The purpose of these two displays 504 is to enable two players to play a game at the same time.

The display housing 501 also includes a game machine control board 508 on which a control circuit is mounted. This control circuit is designed to compute the contents of the game in accordance with a game program that has been stored in an internal memory. Such a computation controls various game images projected onto the screens of the displays 504. Such an image control may display various characters and targets on the screens of the displays 504.

The control housing 502 has a top or control face on which control input devices 506 each including a model gun 503 as a shooting input section are mounted opposite to the respective displays 504. Each of the model guns 503 is provided with a trigger lever 507. As a player P actuates the corresponding trigger lever 507, a trigger signal will be transmitted to the control circuit on the game machine control board 508. In response to such a trigger signal, the control circuit causes the screens of the displays 504 to display an image showing a target shot by a gun, an image showing a bullet deviated from the target and so on.

Two upright supporting columns 509 are disposed directly adjacent to the opposite sides of the control housing 502. A signboard 511 is fixedly mounted on the tops of the supporting columns 509. The signboard 511 is a rectangular plastic plate of white color and includes a sign on the side thereof facing the player P.

Figure 17:
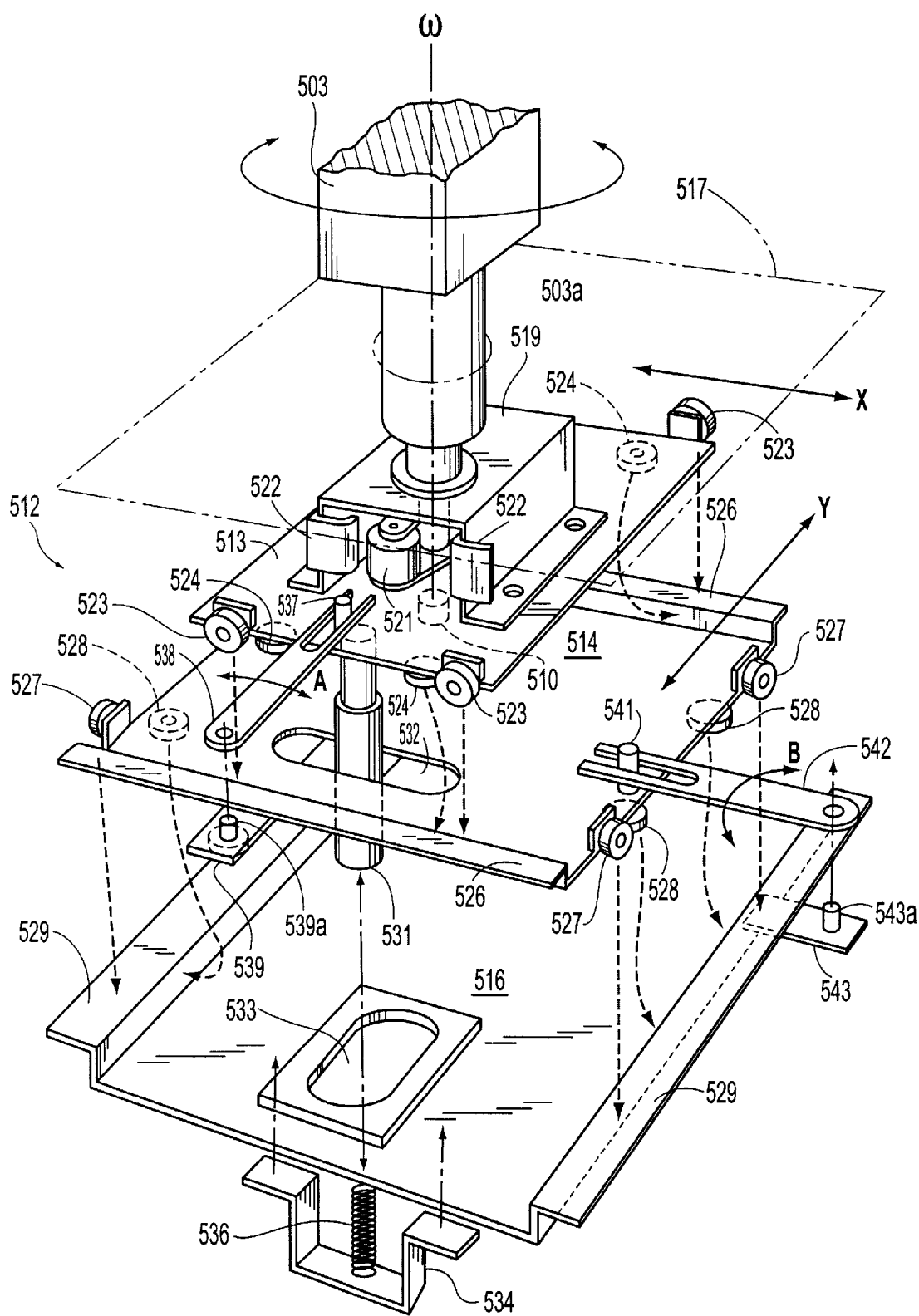
FIG. 17 is a perspective exploded view of a control input device according to the present invention.

Each of the control input devices 506 on the control face of the control housing 502 has a moving body 512 housed in the interior of the housing 502. As shown in FIG. 17, the moving body 512 comprises a first slide table 513 supporting the corresponding model gun 503, a second slide table 514 supporting the first slide table 513 for slidable movement in a direction X and a frame 516 supporting the second slide table 514 for slidable movement in a direction Y, that is, a direction perpendicular to the direction X.

The frame 516 is stationarily mounted on the control housing 502 (see FIG. 18). In FIG. 17, a masking plate 517 is fixedly mounted on the bottom of the corresponding model gun 503 so that the masking plate 517 is externally exposed through an opening 518 formed on the top of the control housing 502 as shown in FIG. 18. As will be described latter, each of the model guns 503 is translationally movable in the two-dimensional plane with the associated masking plate 517.

In FIG. 17, a bearing box 519 is located on the first slide table 513. The bearing box 519 supports the corresponding model gun 503 for rotatable movement about an axis ω. The axis ω passes through the center of a supporting shaft 503a at which the corresponding model gun 503 is supported by the bearing box 519 and extends perpendicular to both the directions X and Y of movement of the first and second slide tables 513, 514. In other words, the supporting shaft 503a of the model gun 503 extends perpendicular to the two-dimensional plane of movement in the model gun 503.

The supporting shaft 503a of the model gun 503 extends into the interior of the bearing box 519, the part thereof within the bearing box 519 being provided with a rotator 521 mounted thereon The rotator 521 is rotatable movable about the axis ω together with the model gun 503. A stopper 522 is formed on each side of the bearing box 519 adjacent to the rotator 521. The bottom of the supporting shaft 503a includes a volume element or potentiometer 510 mounted thereon. This volume element 510 is designed to detect the rotational angle in the supporting shaft 503a and thus in the model gun 503.

In FIG. 18, the player P can grip and rotate the model gun 503 about the axis ω shown in FIG. 17. Thus, the model gun 503 is permitted to rotate until the rotator 521 impacts either of the stoppers 522. In other words, the model gun 503 is rotatable about the axis ω only within an angular range between the stopper pair 522. Such a rotation is detected by the volume element 510 on the bottom of the supporting shaft 503a. Therefore, the player P can aim at any target displayed on the display (FIG. 18).

In FIG. 17. vertically and horizontally directed rollers 523 and 524 are located on the first slide table 513 at the forward and backward end edges, respectively. Guide rails 526 extending in the direction X are located on the second slide table 514 at the forward and backward end edges, respectively. The first slide table 513 is placed on the second slide table 514 such that the vertically directed rollers 523 are placed on the tops of the respective guide rails 526 and the horizontally directed rollers 524 are placed in contact with or close to the inner sides of the respective guide rails 526.

In such an arrangement, the first slide table 513 can freely slidably be moved relative to the second slide table 514 in the direction X, but not moved in the direction Y perpendicular to the direction x.

The opposite sides of the second slide table 514 rotatably support vertically and horizontally directed rollers 527 and 528, respectively. Guide rails 529 extending in the direction Y perpendicular to the direction X are formed on the opposite sides of the frame 516. The second slide table 514 is placed on the frame 516 such that the vertically directed rollers 527 are placed on the tops of the guide rails 529 and the horizontally directed rollers 528 are located in contact with or close to the inner sides of the guide rails 529. As described, the frame 516 is stationarily mounted on the control housing 502.

In such an arrangement, the second slide table 514 is freely slidable in the direction Y, but not slidable in the direction X perpendicular to the direction Y.

With the aforementioned arrangement of the first slide table 513, second slide table 514 and frame 516, the model gun 503 can freely be moved on the frame 516 in the two-dimensional plane defined by the directions X and Y. In the actual structure of the mobile portion 512, however, it is desirable that any limiting frame member (not shown) is designed to limit the upward and downward movements of the frame and first slide table 516, 513 such that the frame 516, second slide table 514 and first slide table 513 stacked one above another will not be displaced relative to one another in the vertical directionas viewed in FIG. 17.

The bottom of the first slide table 513 fixedly supports a stopper member 531 extending downwardly toward the frame 516. The stopper member 531 is formed by such a material that it will not yield relative to the first slide table 513. The portion of the second slide table 514 corresponding to the stopper 531 has an elongated slot 532 extending in the direction X. The width of the slot 532 as viewed in the direction Y is slightly larger than the external diameter of the stopper member 531 such that the stopper member 531 can pass through the slot 532.

The portion of the frame 516 corresponding to the stopper member 531 has a square hole 533 which can be of an appropriate size. This portion of the frame 516 corresponding to the square hole 533 includes a bracket 534 fixedly mounted on the bottom face thereof The bracket 534 fixedly supports one end of a spring 536 as an elastic member. The square hole 533 functions as a guide hole for limiting the movement of the stopper member 531. The configuration of the hole 533 may be of any of various forms such as rectangle, square, ellipse, circle and so on.

When the first and second slide tables 513, 514 are placed on the frame 516, the stopper 531 extending downwardly from the first slide table 513 extends beyond the bottom of the frame 516 through the slot 532 on the second slide table 514 and the square hole 533 on the frame 516. The bottom end of the stopper member 531 is connected to the other end of the spring 536.

In such an arrangement, when the model gun 503 is in its neutral position in which no external force is exerted thereto, the stopper member 531 is maintained at its central position within the square hole 533 or an initial position near to the central position under the action of the spring 536 or by an elastic restoring force. As a result, the model gun 503 is maintained at its initial position on the control face of the control housing 502 shown in FIG. 18.

As the model gun 503 is manipulated by the player P, the former is moved in the two-dimensional plane defined by the directions X and Y under the motion of the first and second slide tables 513, 514 as in FIG. 17. On this movement, the stopper member 531 is moved in response to the slidable movement of the first slide table 513 or the slidable movement of the model gun 503. If the movement is relatively large, the stopper member 531 impacts the peripheral edge of the square hole 533 in the frame 516 so that further movement will be inhibited. In this regard, the square hole 533 is formed by stamping an elastic material into a substantially rectangular configuration before it is trimmed at the edge. Thus, a shock produced when the stopper member 531 impacts the edge of the square hole 533 can be reduced.

In other words, the model gun 503 can be moved in the plane defined by the directions X and Y only within the range defined by the square hole 533. When the player P releases the model gun 503 to remove the external force after he or she has manipulated and translationally moved the model gun 503 to a position spaced apart from its initial position (see FIG. 18. the stopper member 531 is automatically returned to its initial position under the action of the spring 536 connected to the bottom of the stopper member 531 or the elastic restoring force.

A movement detecting pin 537 is located adjacent to the forward end of the first slide table 513 at an appropriate location. This pin 537 is slidably fitted over a detecting piece 538. The end of the detecting piece 537 is connected to an input shaft 539a on a volume element or potentiometer 539 which is fixedly mounted on the second slide table 514 at the forward end thereof.

As the first slide table 513 is slidably moved relative to the second slide table 514 in the direction X, the pin 537 is also moved relative to the second slide table 514 in the direction X. As a result, the detecting piece 538 is rotated about the input shaft 539a of the potentiometer as shown by arrow A. The rotational angle of the detecting piece 538 is read by the potentiometer 539.

A movement detecting pin 541 is also located on the rightward side of the second slide table 514 at an appropriate position. A detecting piece 542 is slidably fitted over this pine 541. The end of the detecting piece 542 is connected to an input shaft 543a on a volume element or potentiometer 543 which is fixedly mounted on the rightward side of the frame 516.

As the second slide table 514 is slidably moved relative to the frame 516 in the direction Y, the pin 541 is also moved relative to the frame 516. As a result, the detecting piece 542 is rotated about the input shaft 543a of the potentiometer as shown by arrow B. The rotational angle is read by the potentiometer 543.

In such an arrangement, the direction and amount of the translational movement in the model gun 503 are detected by these potentiometers 539 and 543.

The game system and control input device will be operated as follows:

In FIG. 18, the game is started by the player P depressing a start button (not shown) on the control housing 502 at an appropriate location. A game image is then displayed on the display 504 in accordance with a game program which has been stored in the control circuit mounted in the control board 508. The player P can select and manipulate either of the model guns 503 depending on that image.

More particularly, the player P moves the model gun 503 by the desired amount in the desired direction and swivels the model gun 503 about the axis ω, if necessary. The player P actuates the trigger lever 507 at an appropriate timing During such an operation, the rotational angle of the model gun 503 is detected by the potentiometer 510 shown in FIG. 17 and the direction and amount of movement of the model gun 503 in the two-dimensional plane are detected by the potentiometers 539 and 543 shown in FIG. 17. The detection signals from these potentiometers are fed to the control board 508 shown in FIG. 18. The signal produced when the trigger lever 507 is actuated is also fed to the control board 508.

When the control board 508 receives the signals corresponding to the rotational angle, two-dimensional movement direction and two-dimensional movement amount of the model gun 503 as well as the signal from the trigger lever 507, the control board 508 computes the contents of the game from these received signals. The computed contents of the game are displayed on the display 504. For example, the game image may indicate whether a displayed target is hit or missed.

In such a manner, the player P can more enjoy the game with a variety of techniques by moving the model gun 503 in the plane to any desired position and actuating the trigger lever 507.

Under the action of the stopper rotator 521 and stoppers 522 shown in FIG. 17, the player P can rapidly operate the model gun 503 without any unnecessarily large rotation.

With provision of the stopper member 531 and square hole 533 shown in FIG. 17, the model gun 503 can rapidly be moved without any unnecessarily wide movement.

Although the present invention has been described as to one preferred embodiment, the present invention is not limited to such an embodiment, but may be carried out in any of various forms within the scope of the invention.

For example, the control input device of the present invention may be used as an input device for any image display device other than the game system, for example, for a simulation system. Furthermore, the model gun used as a shooting input section may be formed into any configuration required by an image display device to which the control input device is applied.

Although the embodiment of FIG. 17 has been described as to the swivelable movement of the model gun 503 in addition to the two-dimensional movement, the present invention may include a technique by which the model gun is only movable in the two-dimensional direction without swivelable movement.

Although the embodiment of FIG. 17 uses the slide mechanism consisting of the rollers 523. 524. 527 and 528 and the rails 526 and 529, such a slide mechanism may be replaced by any other glide mechanism. For example, a slide mechanism using no roller can be used in the present invention.

Since the shooting input section is movable to any position in the two-dimensional direction in the control input device and image display device according to the present invention, the shooting action can more truly be reproduced with the increased flexibility in the input operation of the shooting input section, in comparison with the prior art device in which the shooting input section is only movable in the lateral direction.

Second Embodiment

Another preferred embodiment of a shooting game system to which the present invention is applied will now be described.

Figure 1:
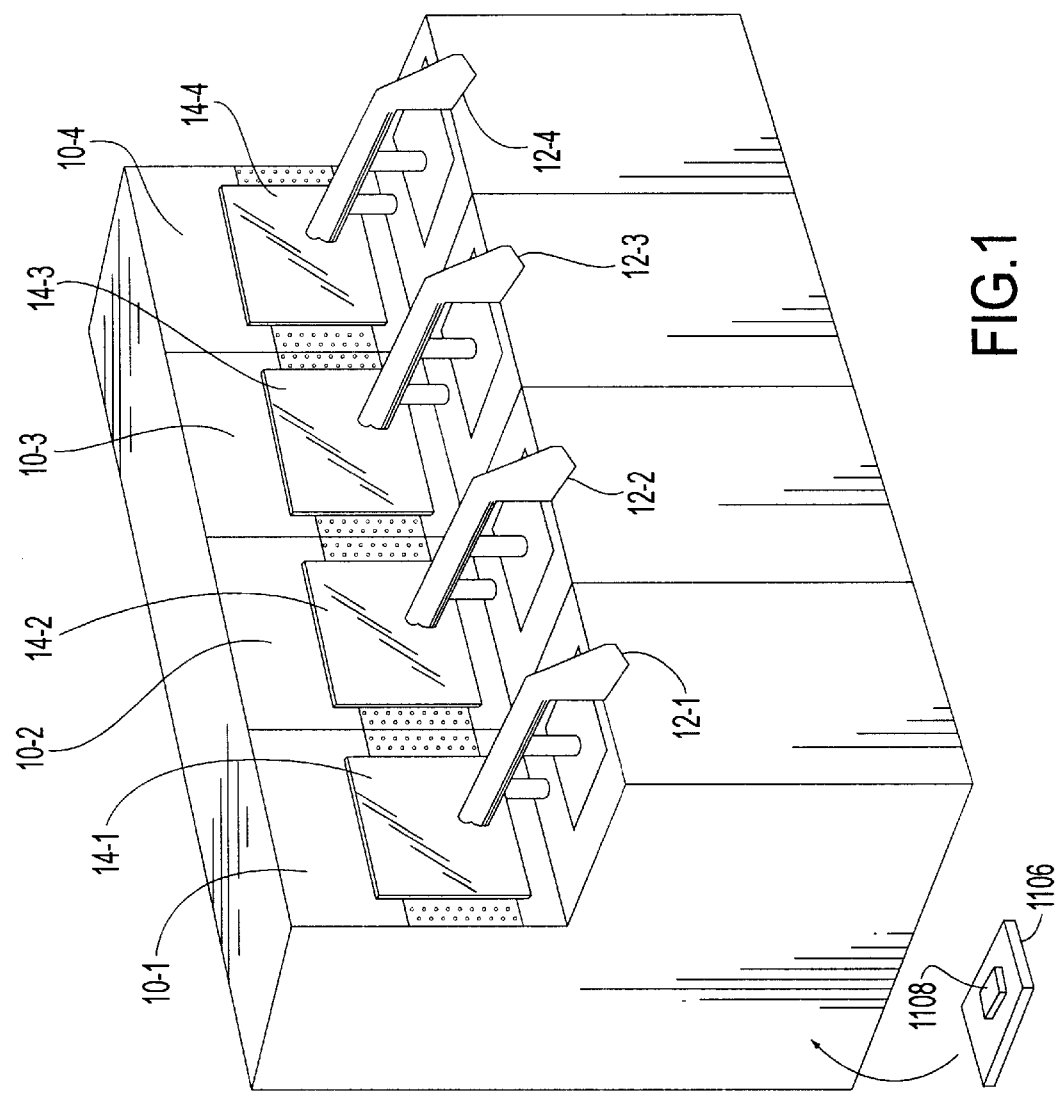
FIG. 1 is a perspective view of the appearance of a game. system according to one embodiment of the present invention.

FIG. 1 shows a shooting game system according to the present invention.

The game system comprises four game devices 10-1 to 10-4 which are interconnected to one another. Each of the game devices 10 includes a display section 14-1, 14-2, 14-3 or 14-4 and a mimic machine gun (or shooting device) 12-1, 12-2, 12-3 or 12-4. The game system can be enjoyed by maximally four players in friend and enemy teams.

Figure 2:
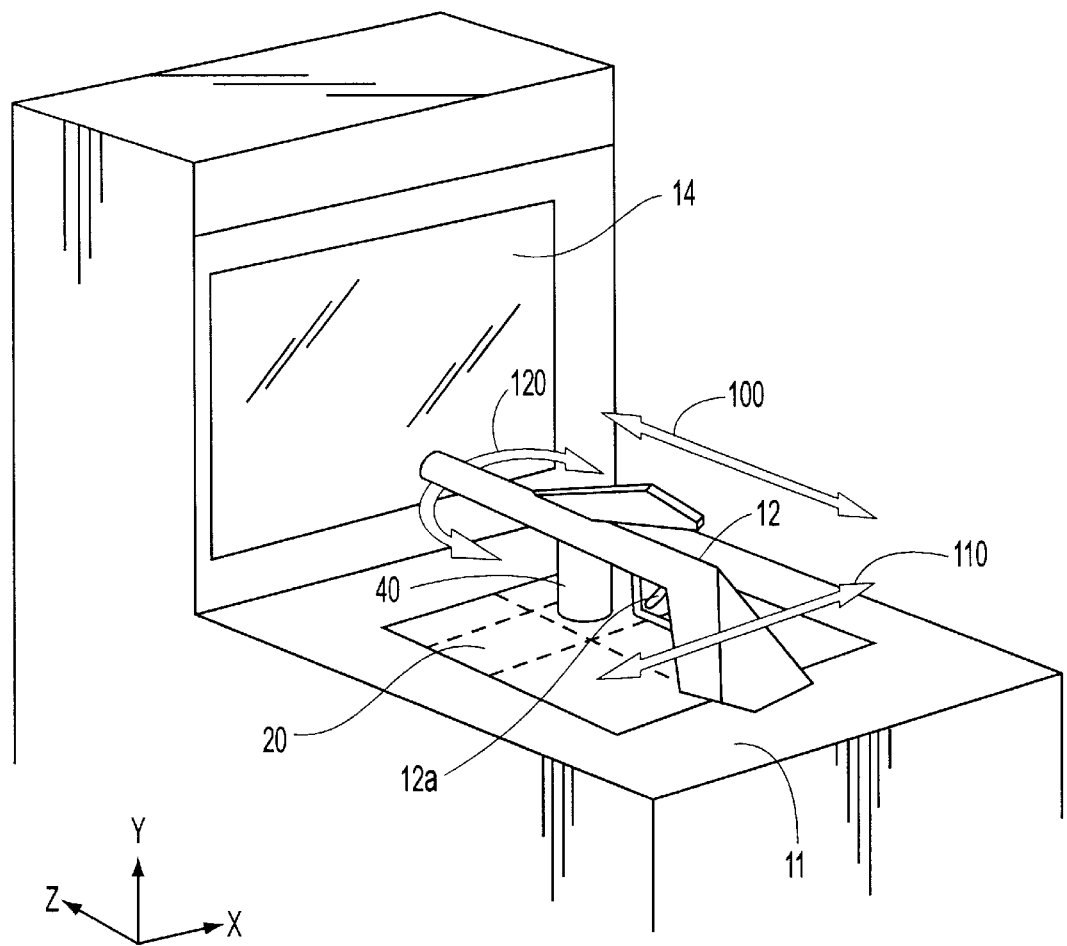
FIG. 2 shows the primary parts of the game system.

As shown in FIG. 2, each of the machine guns 12 is fixedly mounted on the corresponding one of mobile mounts (or moving body) 200.

Each of the mobile mounts 200 is mounted on a machine base 11 forming part of the housing for movements in a first direction 100 and a second direction 110 perpendicular to the first direction 100. If it is assumed herein that when the direction of depth toward the display section 14 is defined by Z-axis direction, X-axis direction is perpendicular to the Z-axis direction in the horizontal plane and Y-axis direction is further perpendicular to the Z-X plane, the first direction 100 is set in the Z-axis direction and the second direction 110 is set in the X-axis direction.

Each of the machine guns 12 is mounted on a supporting column 40 mounted on the corresponding mobile mount 20 and extending in the Y-axis direction for rotatable movement about the Y-axis as shown by arrow 120.

Figure 3:
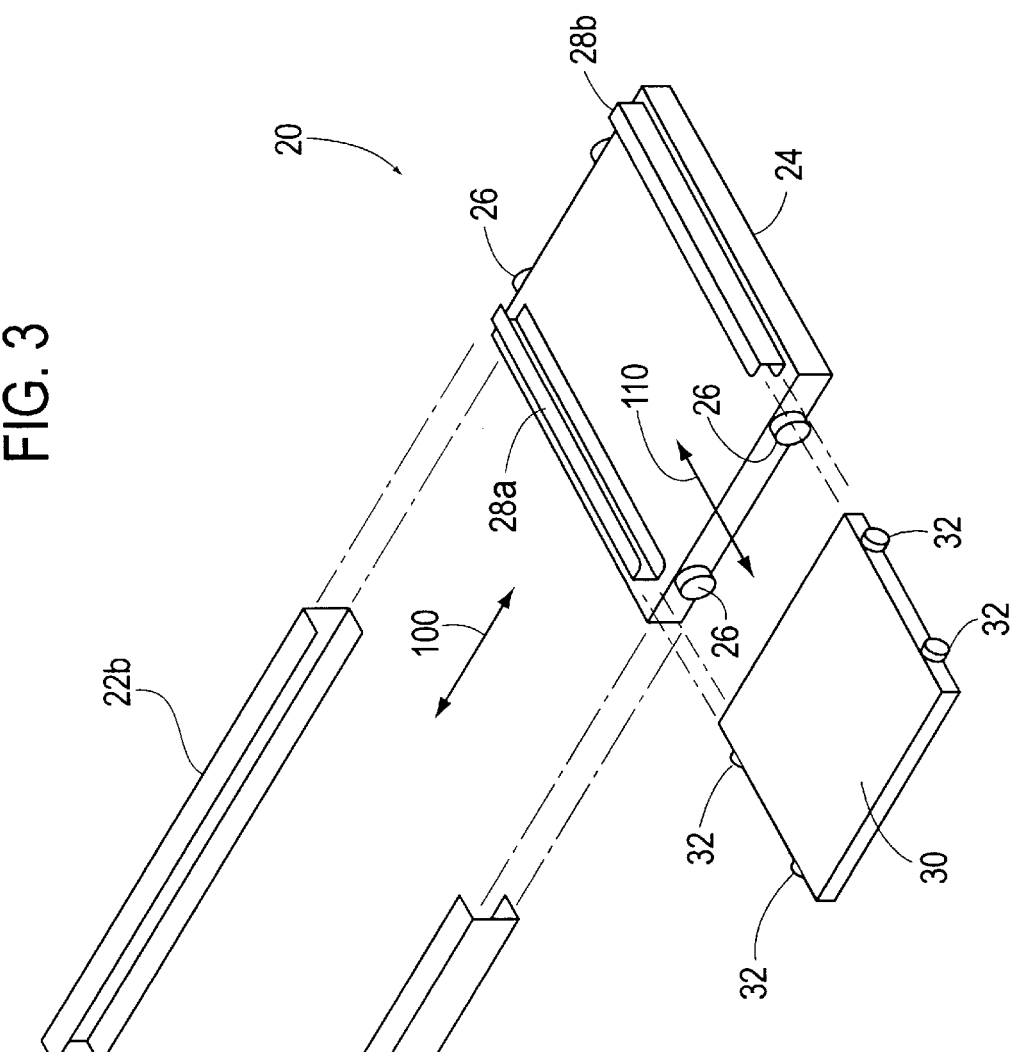
FIG. 3 is a view illustrating a concrete slide mechanism on a mobile mount used in the game system of this embodiment.

FIG. 3 shows a concrete structure of the mobile mount 20.

A pair of rails 22a and 22b are mounted on the machine base 11 forming part of the housing and arranged parallel to each other to extend in the Z-axis direction (or the first direction 100). A first slide portion 24 is mounted on the pair of rails 22a and 22b through rollers 26 for movement in the Z-axis direction (or the first direction 100).

A pair of rails 28a and 28b are mounted on the first slide portion 24 and arranged parallel to each other in the X-axis direction (or the second direction 110). A second slide portion 30 is slidably mounted on the pair of rails 28a and 28b through rollers 32 for movement in the X-axis direction (or the second direction 110).

The first and second slide portions 24, 30 have their ranges of movement limited by stoppers (not shown) such that they will not be detached from the rails 22 and 28.

Restoring forces are applied to the first and second slide portions 24, 30 by biasing means (not shown) such that they will always be biased against their neutral points within the respective z- and X-planes. If no external force is exerted to the first and second slide portions 24, 30, they will automatically be returned to the respective neutral points.

The supporting column 40 shown in FIG. 2 is mounted upright on the second slide portion 30. As described, the machine gun 12 is rotatably mounted on this supporting column 40 for movement in such a direction as shown by arrow 120.

The details of the structure in the mobile mount 20 may be similar to those of the mobile portion 512 in the first embodiment shown in FIG. 17.

The display sections 14 can display player's character objects (or character objects controlled by players), enemy character objects, friend character objects, maps, backgrounds and so on.

Figure 4:
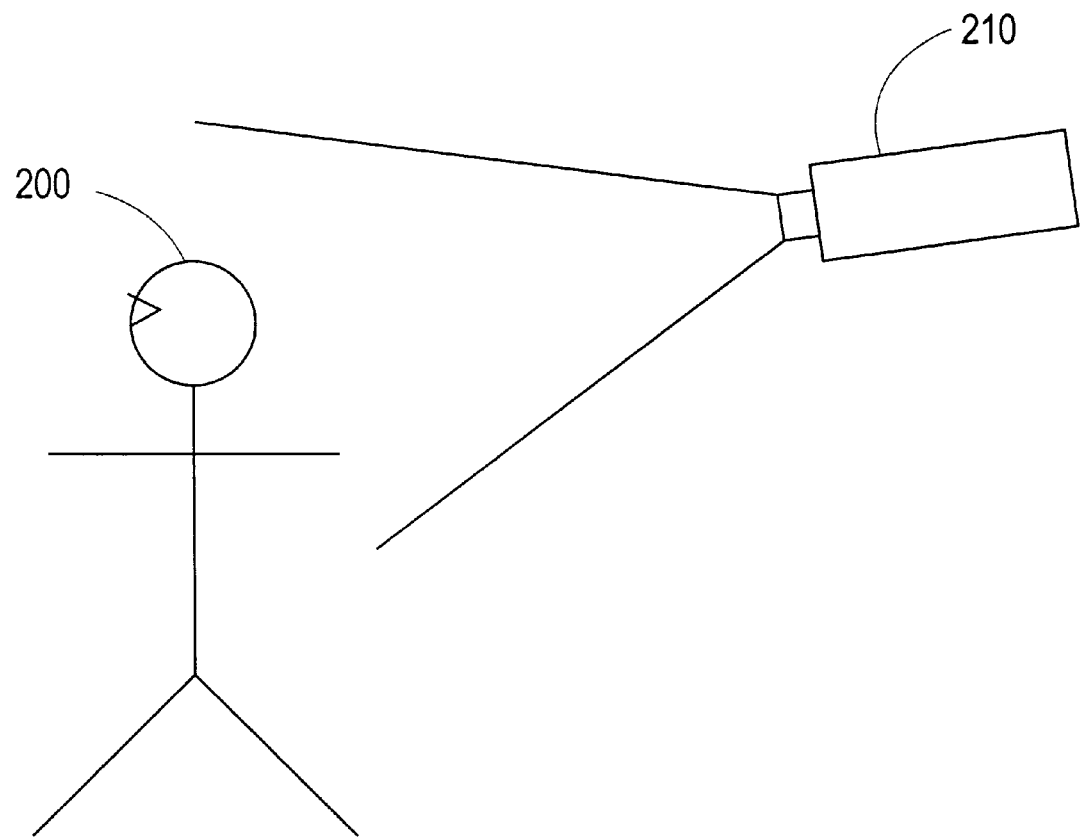
FIG. 4 illustrates the relationship between a player's character object and a virtual camera.

As shown in FIG. 4, this second embodiment includes a virtual camera 210 set relative to a player's character object 200 moving within a three-dimensional object space at a third person viewpoint. The viewpoint and direction or the virtual camera 210 object 200 is so set that the foreground including the player's character is projected backwardly and upwardly as viewed from the player's character object 200. Thus, the display 14 will display a game image including the players character object 200 moving within the object space as well as an image in front of the player's character object 200.

The first feature of this embodiment is that when a player moves its own machine gun 12 in a combined direction of the first and second directions 100, 110 and shoots a target shown on the display 14, the player's character object 200 can also be moved in the same direction within the game space (or three-dimensional object space).

The second feature of this embodiment is that when a player swivels its own machine gun 12 in the direction of arrow 120 (or in the direction of rotation about the Y-axis), the facing direction of the player's character object 200 can follow the motion of the machine gun 12. The facing direction of the virtual camera 210 is also changed following the motion of the player's character object 200. Thus, the display 14 will display an image viewed from the player's character object 200 as a game image.

In this embodiment, thus, the player's character object 200 can be moved within the object space in all the horizontal directions by moving the machine gun 12 in all the horizontal directions. In addition, the facing direction of the player's character object 200 can be changed by swiveling the machine gun 12 as shown by arrow 120. Consequently, the player can enjoy the shooting game in such a manner that the player searches a predetermined target within the object space and actuates the trigger 12a on the machine gun 12 to shoot that target as well as enemy character objects.

Figure 5:
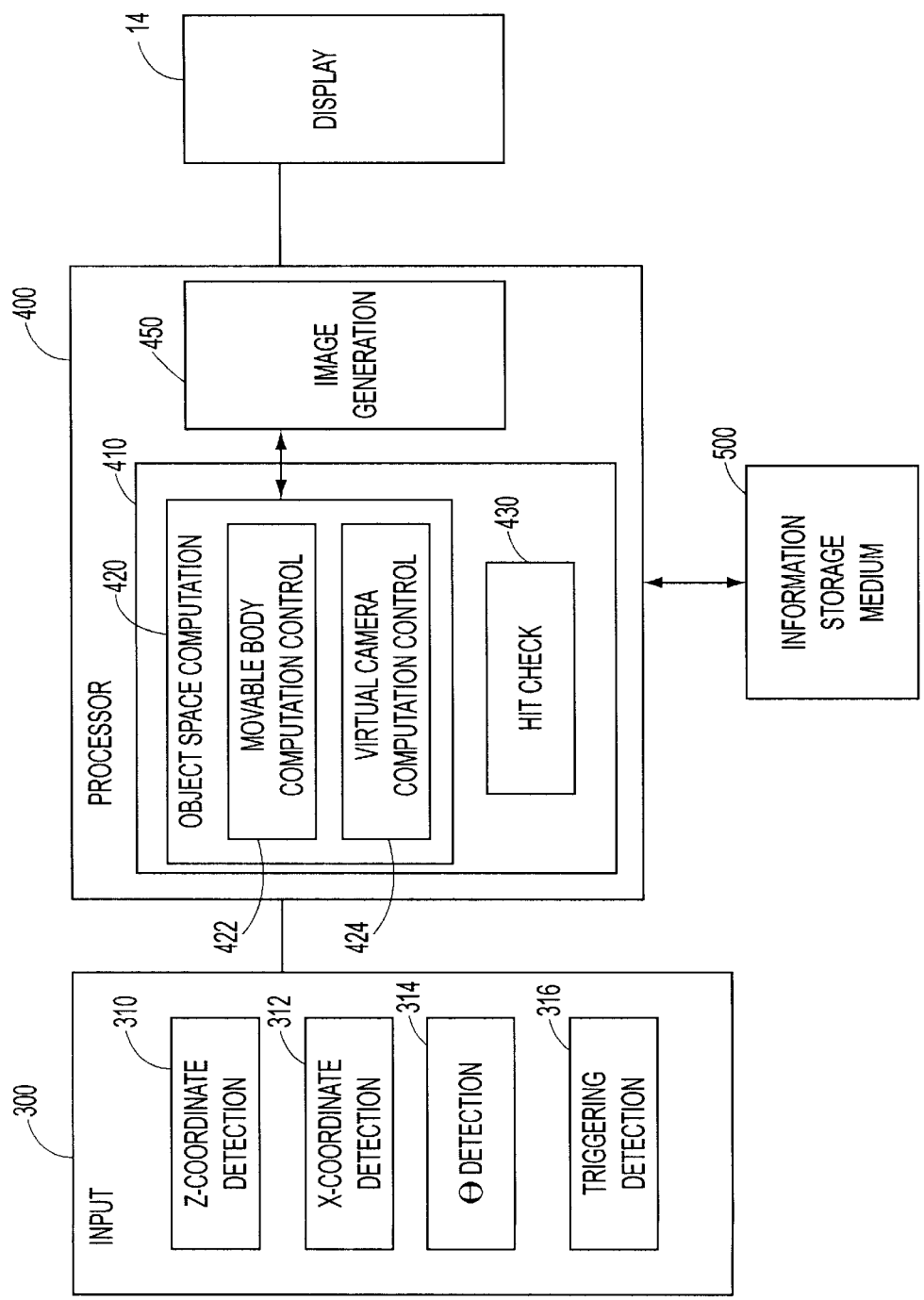
FIG. 5 is a functional block diagram of the game system of this embodiment.

FIG. 5 is a functional block diagram of the game system according to this second embodiment of the present invention.

The game system comprises an input section 300 through which the player can input any control data for controlling such a machine gun as shown in FIG. 1 and other data. The control data from the input section 300 is then inputted into a processor section 400.

Figure 6A:
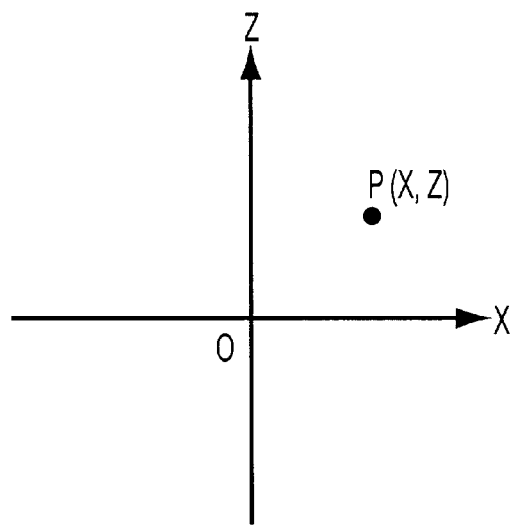

The input section 300 comprises a Z-coordinate detecting portion 310 for detecting the Z-coordinate of the mobile mount 200 as shown in FIG. 2 and an X-coordinate detecting portion 312 for detecting the X-coordinate of the mobile mount 200. In this embodiment, as shown in FIG. 6A, the mobile mount 200 is designed to bias the first and second slide portions 24, 30 against an neutral point in the X-Z coordinates (wherein X=0 and Z=0) under the action of biasing means (not shown). The reference position of the Z- and X-coordinate detecting portions 310, 312 is the neutral point of the mobile mount 200. The positional coordinates relative to this reference position are detected as the position P of the machine gun 12 (X and Y).

The input section 300 also comprises a θ detecting portion 314 and a trigger detecting portion 316.

Figure 6B:
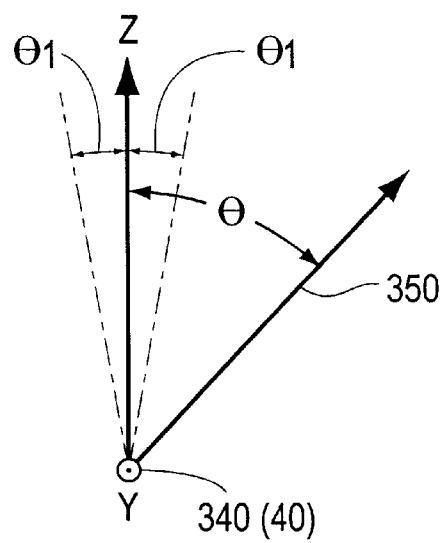
FIG. 6B illustrates the detection of a shooting device facing direction.

The θ detecting portion 314 is designed to detect the rotational angle θ of the machine gun 12 rotated about the supporting column 40 in the direction of arrow 120. More particularly, as shown in FIG. 6B, the facing direction 350 of the machine gun 12 is detected as an angle θ relative to a reference position when the supporting column 40 is assumed to be a center of rotation 340 and if it is assumed that the angle of the reference position is equal to zero in the Z-axis direction (or the direction toward the display 14) as viewed from the center or rotation 340.

The trigger detecting portion 316 is designed to detect the actuated trigger 12a in the machine gun 12.

These detecting portions 310, 312 and 314 may be in the form of a variable resistor for detecting the rotational angle. For example, the detecting portions 310 and 312 may be variable resistors for detecting the slidable movement of the first and second slide portions 24, 30 in the first and second directions 100, 110 as rotational angles. The remaining detecting portion 314 may be a variable resistor for detecting the rotational angle of the machine gun 12 rotated about the supporting column 40.

The processor section 400 is designed to perform various processings relating to the arrangement of objects within the object space and the generation of images when the object space is viewed from given viewpoint and direction (or images viewed from the virtual camera 210), in response to data from the input section 300 and in accordance with a given program. The function of the processor section 400 may be accomplished by any structure of hardware such as CPU (CISC type or RISC type), DSP, ASIC (gate array and so on), memory or the like.

An information storage medium 500 is designed to store the program and data. The function of the information storage medium 500 may be accomplished by any structure of hardware such as CD-ROM, game cassette. IC card, MO, FD, DVD, hard disc, memory or the like. The processor section 400 will perform various proceedings based on the program and data from the information storage medium 500.

The processor section 400 comprises a game computing section 410 and an image generating section 450.

The game computing section 410 is designed to perform various processings such as the setting of the game mode, the progress of the game, the determination of the position and direction of the moving body, the determination of the view point and direction the and arrangement of the objects within the object space.

The image generating section 450 is designed to generate an image when the object space Set by the game computing section 410 is viewed from a&given viewpoint. The generated image is displayed on the display section 14.

The game computing section 410 includes an object space computing portion 420 and a hit checking portion 430.

The object space computing portion 420 is designed to arrange various objects such as player's character objects, target objects (including enemy and other objects), friend objects, map objects, background objects and other objects within the object space. More particularly, the object space computing portion 420 may perform various computations of determining the arrangement of the map and background objects depending on the game stage and moving the moving bodies (player,s character objects, target objects, friend objects, shot objects and so on) within the object space.

According to this embodiment, the object space computing portion 420 is designed to arrange a sight object for aiming at the other objects within the object space.

The object space computing portion 420 comprises a moving body computation control part 422 and a virtual camera computation control part 424.

The moving body computation control part 422 is designed to a computation of moving an moving body controlled by a player (or player's character object) and any moving body controlled by a given control program (through a computer) within the object space, in response to data from the input section 300 and in accordance with a given program. More particularly, the moving body computation control part 422 may compute the position and direction of any moving body, for example, for each frame (or 1/60 seconds).

Figure 7:
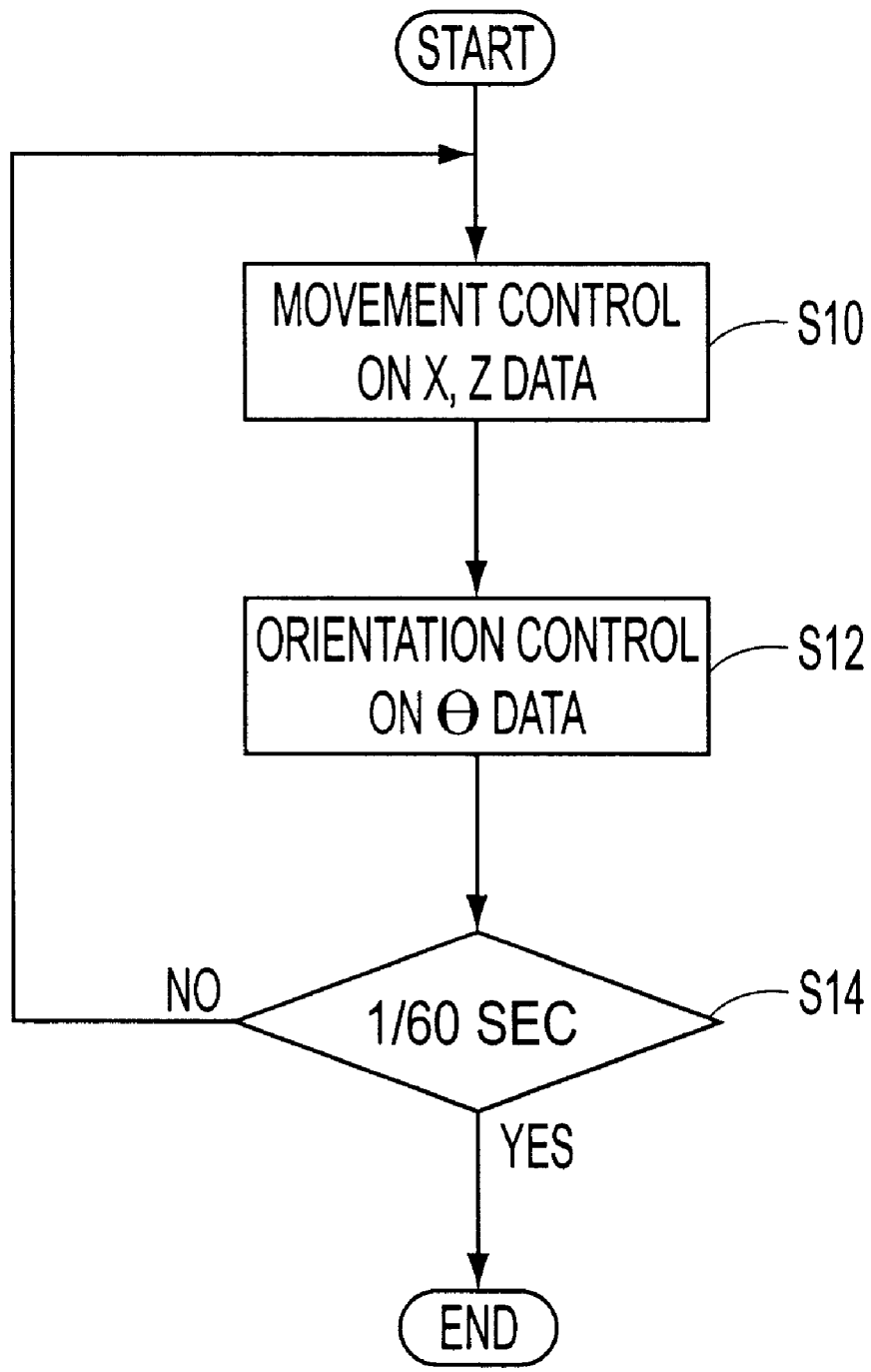
FIG. 7 is a flowchart illustrating the control of the movement and facing direction of a player object based on an input signal.

FIG. 7 is a flowchart illustrating the motion of a layer's character object controlled by the moving body computation control part 422.

At stop S10, the movement of the player's character object is controlled based on the detected X-Z data.

In other words, the player's character object is stationary if its own machine gun 12 is at the reference position (P=0, 0).

As the machine gun 12 is moved back-and-forth against the biasing force, the Z-coordinate thereof is detected by the Z-coordinate detecting portion 310. The moving body computation control part 422 performs a computation of back-and-forth moving the player's character object within the object space at a speed proportional to the detected Z-coordinate value. Similarly, as the machine gun 12 is moved laterally against the biasing force, the movement of the machine gun is detected by the X-coordinate detecting portion 312. The moving body computation control part 422 then performs a computation of laterally moving the player, 8 character object at a speed proportional to the detected X-coordinate value. When the player moves the machine gun 12 in all the horizontal directions, thus, the moving body computation control part 422 causes the player's character object to move in all the horizontal directions, based on the Z- and X coordinate values of the moved machine gun.

At step 512, then, the facing direction of the player's character object is controlled based on the angle data θ of the detected machine gun 12.

More particularly, as the machine gun 12 is directed to the other direction against the biasing force, the changed direction of the machine gun 12 is detected by the θ detecting portion 314 as a rotational angle θ relative to the Z-axis direction as a reference. The moving body computation control part 422 makes a computation of changing the facing direction of the player's character object following the detected rotational angle θ. In this embodiment, as shown in FIG. 6B, there are dead zones $\theta_1$ on the opposite clockwise and counter-clockwise directions relative to the reference direction. Even if the machine gun 12 is moved into each of the dead zones, the facing direction of the player object will not be changed The purpose of these dead zones is to avoid frequent changes in the facing direction of the player's character object due to hand walk or the like As the facing direction 350 of the machine gun 12 has an angle larger than that of the dead zones $\theta_1$, moving body computation control part 422 makes a computation of changing the facing direction of the player's character object following the detected rotational angle θ. In this embodiment, the facing direction of the player's character object can more rapidly be changed an the detected rotational angle θ increases.

After the facing direction of the player's character object has been changed and when the machine gun 12 is moved in all the horizontal directions, moving body computation control part 422 performs a computation of moving the player's character object within the object space with the new facing direction of the player's character object being in the Z-axis direction.

The moving body computation control part 422 will repeat such S10 and S12 proceseings each time when ⅟60 seconds expires at step S14.

The virtual camera computation control part 424 is designed to make such a control that the virtual camera 210 is always located at a third person viewpoint backwardly of the players character object 200 as shown in FIG. 4. As the player's character object 200 is moved into the object space, thus, the position and viewpoint of the virtual camera 210 are also changed following the motion of the player's character object 200.

The hit checking portion 430 is designed to check whether or not any target object is hit by shot based on the facing direction 350 of the machine gun 12 inputted from the θ detecting portion 314, the input signal from the trigger control detecting portion 316 and others.

Figure 10B:
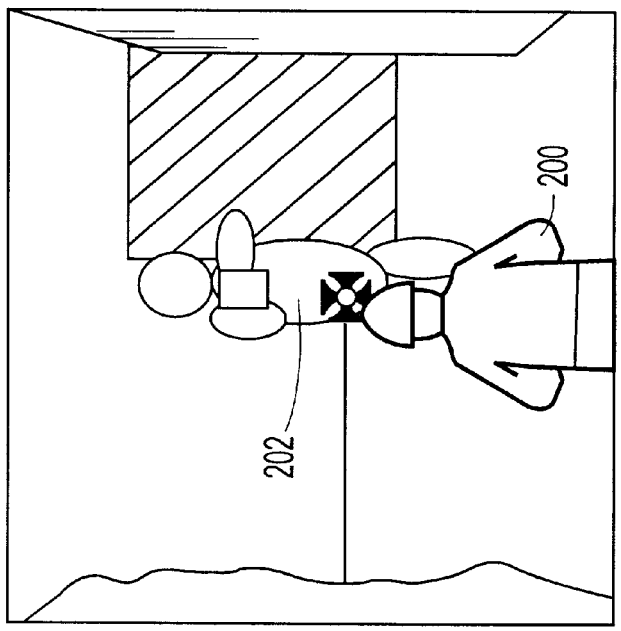
FIG. 10 illustrates a game image when the player's character object advances.

FIGS. 8 to 10 show a series of processings for slidably moving the machine gun 12 back-and-forth to move the player's character object back-and-forth.

For example, when the machine gun 12 is slidably moved in the forward direction as shown in FIGS. 8A and 8B, the Players character object 200 is also moved within the object space in the forward direction, as shown in FIG. 9. At this time, an enemy character object 202 exists in front of the player's character object 200. Thus, the player's character object 200 will approaches that enemy character object 202.

Figure 10A:
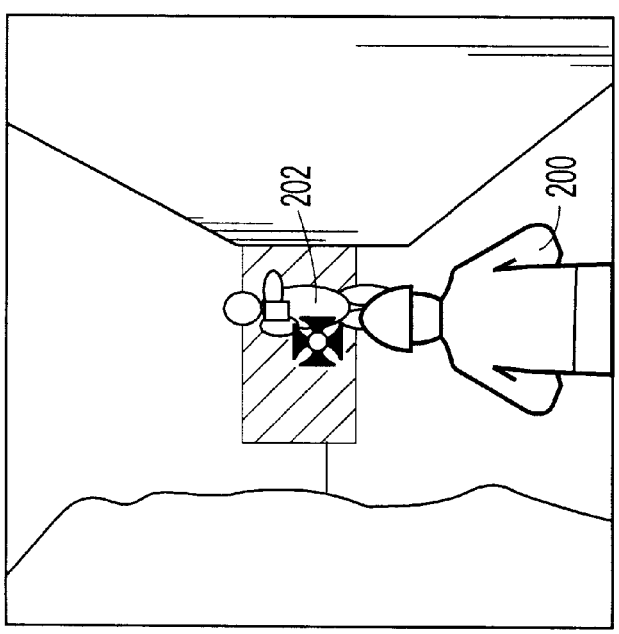

At this time, the image displayed on the display section 14 will be changed from an image in which the player's character object 200 is at a position before advance as shown in FIG. 10A to another image in which the player's character object 200 is advancing to approach the enemy character object 202.

FIGS. 11 to 13 show a series of processings for slidably moving the machine gun 12 in the lateral direction to move the player's character object 200 in the lateral direction.

Figure 11B:
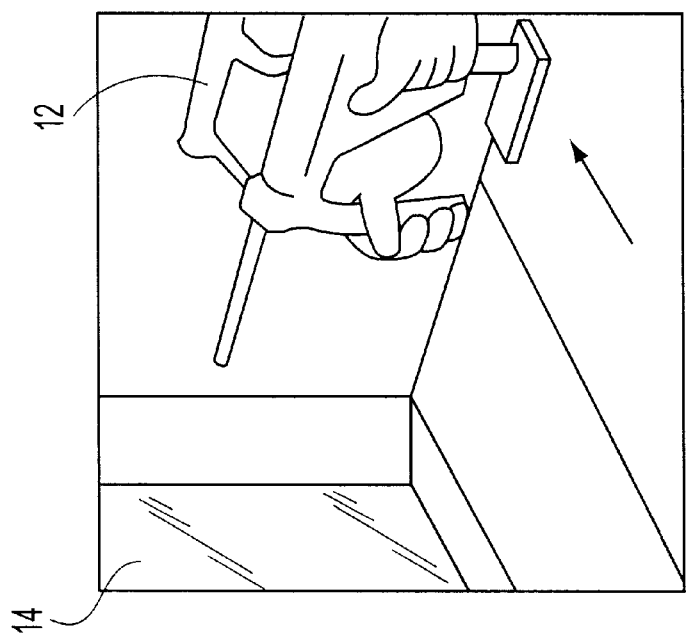
FIG. 11 illustrates the control of the lateral movement of the shooting device.
Figure 11A:
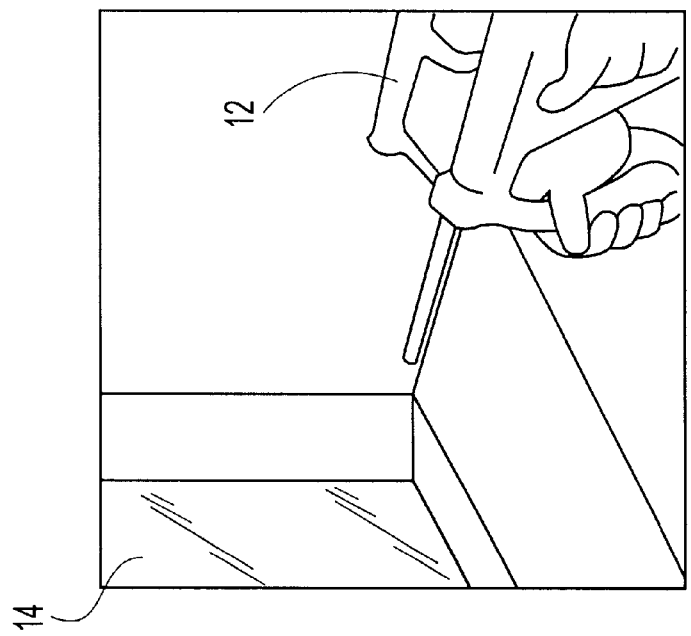
Figure 12B:
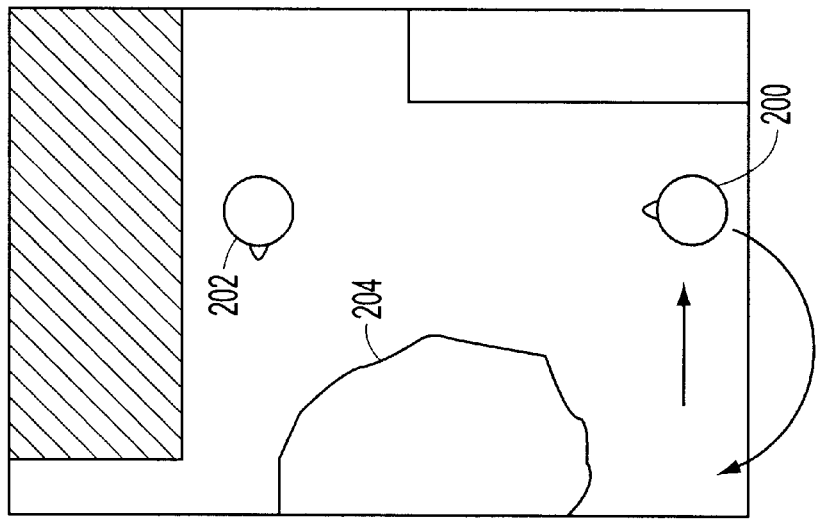
FIG. 12 illustrates the lateral movement of the player's character object.
Figure 12A:
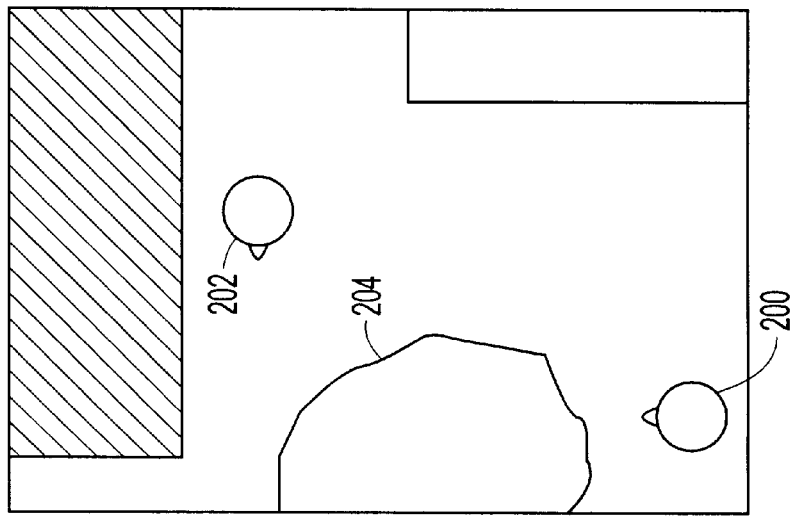

For example, when the machine gun 12 is moved rightwardly as shown in FIGS. 11A and 11B, the player's character object 200 is also moved within the object space in the rightward direction as shown in FIGS. 12A and 12B. This may represent the player's character object 200 moved rightwardly behind a shade 204, for example.

Figure 13B:
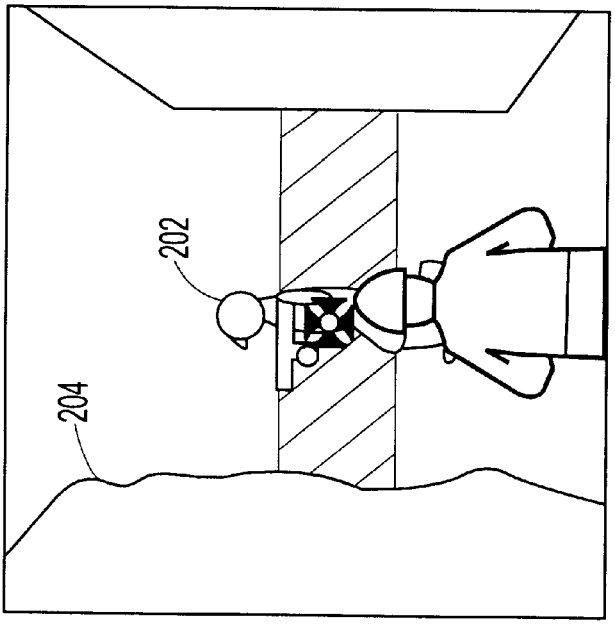
FIG. 13 illustrates a game image in which the player's character object moves laterally.
Figure 13A:
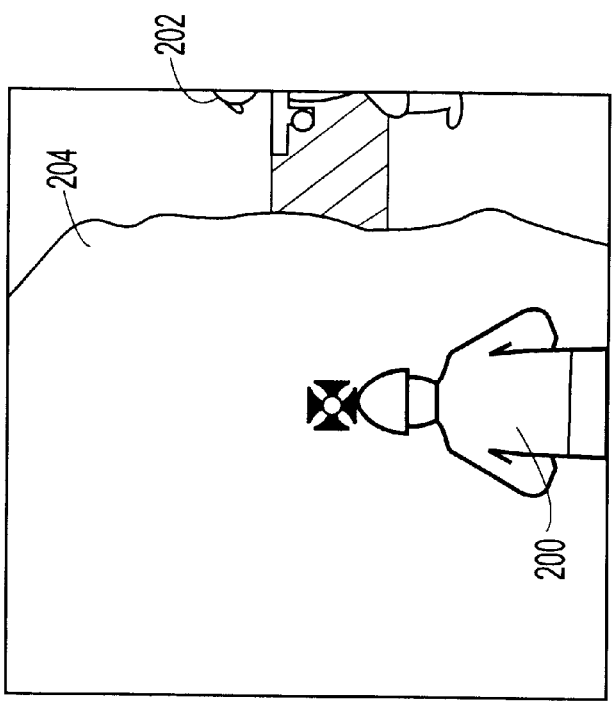

At this time, the image displayed on the display section 14 will be changed from an image in which the player's character object 200 is hiding behind the shade 204 as shown in FIG. 13A to another image in which the player's character object 200 crabs out of the shade 204 in the lateral direction as shown in FIG. 13B. Therefore, the player can enjoy a hit-and-away technique by which the player triggers the machine gun 12 to attack an enemy character object 202 when the player's character object 200 is laterally moved to a position directly opposite to the enemy character object 202 and thereafter hides behind the shade 204 before the player's character object 200 receives a counterattack from the enemy character object.

FIG. 14 shows a series of processings for changing the facing direction of the machine gun 12 and thus player's character object.

As shown in FIGS. 14A to 14C, for example, a sight 220 displayed on the screen may be moved rightwardly as the facing direction of the machine gun 12 is rightwardly swiveled. Accompanying such an action, the facing direction of the player's character object 200 within the object space will also be changed following the movement of the machine gun 12. The display section 14 will display an image in which the player's a character object 200 is oriented in a new direction. In such a state, it is assumed that the direction of the player's character object 200 is Z-axis direction. As the machine gun 12 is moved in all the horizontal directions, thus, the player's character object 200 can also be moved within the object space in all the horizontal directions.

When the machine gun 12 is pointed out of the screen as shown in FIG. 14C, the sight 220 remains stationary at the and of the screen, but the background will be scrolled in the reverse direction. More particularly, in such a state, the facing direction of the player's character object 200 is rightwardly changed within the object space, followed by the virtual camera 210. Therefore, the image viewed from the virtual camera 210 will be displayed on the display section 14 as if the screen is scrolled.

According to the game system of the present invention, the player can grasp the machine gun 12 with both hands and slidably move the player's character object 200 within the object space in all the horizontal directions. By changing the direction of the machine gun 12, furthermore, the facing direction of the player‚s character object 200 can be changed. Thus, the player can move the player's character object 200 with such a feel as the player itself moves with the machine gun 12 within the object space. Furthermore, the player can aim at and shoot a predetermined target through its own machine gun 12. Consequently, the player can enjoy the shooting game in an easy and natural manner.

The system according to this embodiment is designed to move the machine gun 12 in all the horizontal directions and to move the player's character object 200 on a plane of character movement depending on the motion of the machine gun 12 even if more or less irregularity exists on the plane of character movement within the object space.

A structure of hardware by which this embodiment can be realized will now be described with reference to FIG. 15.

Figure 15:
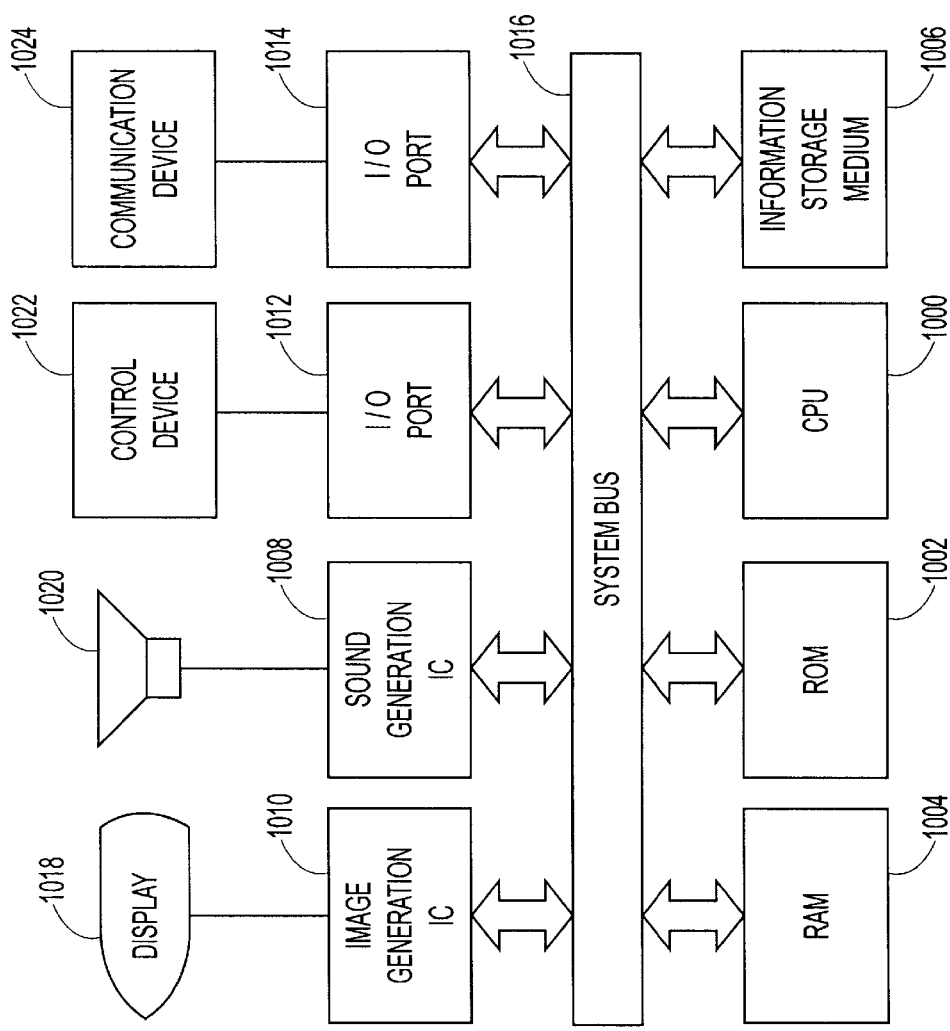
FIG. 15 is a hardware arrangement that can be realized by this embodiment.

The system shown in FIG. 15 comprises a CPU 1000, a ROM 1002, a RAM 1004, an information storage medium 1006, a sound generating IC 1008, an image generating IC 1010 and I/O ports 1012, 1014 all of which are interconnected through a system bus 1016 for data transmission/reception. The image generating IC 1010 is connected to a display 1018; the sound generating IC 1008 to a speaker 1020; one of the I/O ports 1012 to a control device 1022; and the other I/O port 1014 to a communication device 1024.

The information storage medium 1006 is mainly designed to store programs, image data to be displayed, sound data and so on. For example, a domestic game system may utilize any of CD-ROM, game cassette, DVD and the like as an information storage medium for storing the game programs and others. An arcade game system may utilize any memory such as ROM or the like. In the latter case, the information storage medium 1006 becomes the ROM 1002.

The control device 1022 corresponds to a game controller, control panel or the like and is used for a player to input the results of judgement obtained according to the progress of the game into the main system body.

The CPU 1000 is designed to control the entire system and process various data in accordance with the system program (information of system initialization and so on) stored in the ROM 1002 and input signals and others through the control device 1022. The RAN 1004 is a storage means used as working area or the like and which is designed to store the contents in the information storage medium 1006 and ROM 1002 or the results of computation from the CPU 1000. The data structure having a logical structure for realizing this embodiment of the present invention will be constructed on the RAM or information storage medium.

Furthermore such a type of game system is designed to have the sound and image generating IC's 1008, 1010 which output preferred game sounds and images. The sound generating IC 1008 is an integrated circuit for generating game sounds such as sound effects and background music, based on the information stored in the information storage medium 1006 and ROM 1002. The generated game sounds are outputted through the speaker 1020. The image generating IC 1010 is an integrated circuit for generating image information to be outputted to the display 1018, based on the image information from the information storage medium 1006 and the like. The display 1018 may be in the form of a so-called head mount display (HMD).

The communication device 1024 is designed to reciprocate various portions of information utilized in the interior of the game system to and from the outside. The communication device 1024 is connected to the other game system and utilized to transmit and/or receive given information in accordance with the game program, to transmit and/or receive information such as game programs and the like through the communication line and to execute other processes.

Various proceedings described in connection with FIGS. 1 to 14 can be accomplished by the information storage medium 1006 stored the program for performing the processes shown in the flowchart of FIG. 7, the CPU 1000 actuated according to such a program, the image generating IC 1010, the sound generating IC 1018 and so on. The processes performed by the image generating IC 1010, the sound generating IC 1008 and the like may be made by the CPU 1000 or through software such as all-purpose DSP or the like.

FIG. 1 shows an example of the arcade game system to which this embodiment of the present invention is applied. In such a case, the CPU, image generating IC and sound generating IC are mounted on a system board 1106 included in the game apparatus. Information including first information for causing a character controlled by each player to fight against any enemy character and to capture items from one another within a predetermined game space and for determining and displaying distributable items from the items hold by a smashed character in accordance with a predetermined rule, second information for adding the captured distributable items to the items held by the won character, third information for subtracting the items held by the smashed character in accordance with a predetermined rule and fourth information for renewing the smashed character under a predetermined condition are secured in the memory 1108 which is an information storage medium on the system board 1106. The information will be referred to "stored information". The stored information includes at least one of program code for performing various processes mentioned above, image information, sound information, information of object forms, table data, list data and player information.

The present invention can be applied to a domestic game system. In such a came, the domestic game system may have an input section of a structure similar to that of FIGS. 1 to 3 and use the mobile mount 20 and machine guns 12. In this case, the stored information may be stored in a CD-ROM, IC card or the like which is an information storage medium detachably mounted on the game machine body.

Figure 16:
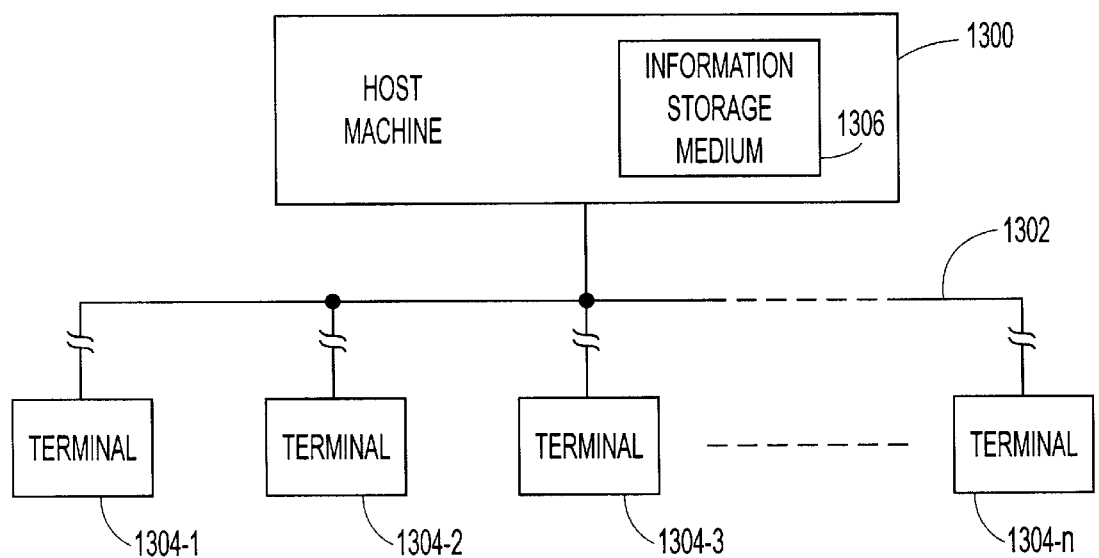
FIG. 16 illustrates another form which can be embodied according to the present invention.

FIG. 16 shows a game system according to this embodiment which includes a host device 1300 and a plurality of terminals 1304-1 to 1304-n connected to the host device 1300 through a communication line 1302. In this case, the aforementioned stored information has been stored in an information storage medium 1306 which is any one of magnetic disc device, magnetic tape device, memory or the like which can be controlled by the host device 1300. If each of the terminals 1304-1 to 1304-n can be used as a stand-alone machine which comprises a CPU, an image generating IC and a sound generating IC and is designed to generate game images and game sounds, a game program or the like for generating the game images and game sounds is fed from the host device 1300 to the terminals 1304-1 to 1304-n. On the other hand, if the terminals is not in the form of stand-alone machine, the host device 1300 generates the game images and sound images which are in turn fed to and outputted from the terminals 1304-1 to 1304-n.

The present invention is not limited to the aforementioned embodiment, but may be carried out in any of various other forms.

Although the aforementioned embodiment has been described as to the slide mechanism in which the mobile mount 20 can be moved in the Z-X plane in all the horizontal directions, the present invention is not limited to such a slide mechanism, but may be applied to any other suitable mechanism. The plane of movement is not limited to a flat plane, but may be curved with a predetermined curvature.

Although the aforementioned embodiment has been described as to the mobile mount 20 which can only move in the first and second directions, the present invention is not limited to such a mobile mount, but may be applied to any other structure which can also move in the third or vertical direction, if necessary. In such a case, the player's character object may be controlled in either of the X, Y or Z direction, following the motion of the mobile mount 20.

Although the present invention has been described as to the shooting game system, the present invention is not limited to such a shooting game system, but may be applied to any of various other game systems For example, the present invention may be applied to such a football game system in which a player manipulates a grip on the mobile mount 20, the grip being used to move a player's character object as a football player in all the horizontal directions in place of the shooting device or machine gun 12. The grip may be formed for rotational movement, for example, about the Y-axis in the lateral direction to change the facing direction of the player's character object. Further preferably, the grip may include a trigger button used to kick a ball. Thus, the player can enjoy the football game by moving the grip to move the player's character object in all the horizontal directions and also by laterally rotating the grip to change the facing direction of the player's character object and sometimes actuating the trigger button to kick the ball.

Although the aforementioned embodiment has been described as to the control of the movement and direction of the player's character object based on the input operation, the virtual camera 210 may be located at a first person viewpoint (or the level of eyes of the player's character object). Such a virtual camera may be moved within the object space in all the horizontal directions depending on the motion of the shooting device 12. The facing direction of the virtual camera 210 may also be changed depending on the direction of movement of the shooting device 12. In such a manner, a game image viewed from the first person viewpoint can be displayed as in the previous embodiments.

What is claimed is:

1. A control input device for simulating shooting comprising:

a shooting input section disposed opposite to an image display section;

a moving section arranged to provide two dimensional movement, in all directions within only a single plane, of the shooting input section relative to the image display section; and a detecting section arranged to detect an amount of two dimensional movement of the shooting input section relative to the image display section.

2. The control input device according to claim 1, wherein the shooting input section is rotatably mounted on the moving section; and wherein the control input device further comprises a rotation detecting section for detecting a rotational angle of the shooting input section.

3. The control input device according to claim 1, wherein the moving section comprises:

a first slide table supporting the shooting input section;

a second slide table supporting the first slide table for a movement in one direction; and a frame supporting the second slide table for a movement in a direction perpendicular to the one direction.

4. The control input device according to claim 2, wherein the moving section comprises:

a first slide table supporting the shooting input section;

a second slide table supporting the first slide table for a movement in one direction; and a frame supporting the second slide table for a movement in a direction perpendicular to the one direction.

5. The control input device according to claim 3, wherein a stopper member is fixedly mounted on the first slide table, and wherein one end of an elastic member is connected to the stopper member, the other end of the elastic member being connected to the frame.

6. The control input device according to claim 4, wherein a stopper member is fixedly mounted on the first slide table, and wherein one end of an elastic member is connected to the stopper member, the other end of the elastic member being connected to the frame.

7. A game system comprising:

input means for moving a character, the input means being movable in at least both of a first linear direction and a second linear direction within only a single plane, the second linear direction being perpendicular to the first linear direction; and processor means for computing and displaying, via a display means, a game image in which at least one of the character and a virtual camera is movable within a game space in a combined direction of the first and second directions, based on an input signal from the input means corresponding to an amount of movement of the input means in the first linear direction and in the second linear direction.

8. The game system according to claim 7, wherein the input means is disposed in front of a display showing a game image, the first direction being defined as a direction facing toward the display, the second direction being defined as a direction perpendicular to the first direction in a horizontal plane.

9. The game system according to claim 7, wherein the processor means computes a game image in which at least one of the character and the virtual camera moves in the second direction while facing the first direction, based on an input signal from the input means corresponding to an amount of movement of the input means in the second direction.

10. The game system according to claim 8, wherein the processor means computes a game image in which at least one of the character and the virtual camera moves in the second direction while facing the first direction, based on an input signal from the input means corresponding to an amount of movement of the input means in the second direction.

11. The game system according to claim 7, wherein the input means comprises:

a moving body mounted on a machine base so as to be moved in both the first and the second directions; and a shooting device provided on the moving body for aiming at and shooting a target displayed in the game image, and wherein the processor means changes a facing direction of at least one of the character and the virtual camera based on a facing direction of the shooting device.

12. The game system according to claim 8,
wherein the input means comprises:
a moving body mounted on a machine base so as to be moved in both the first and the second directions; and
a shooting device provided on the moving body for aiming at and shooting a target displayed in the game image, and
wherein the processor means changes a facing direction of at least one of the character and the virtual camera based on a facing direction of the shooting device.

13. The game system according to claim 10,
wherein the input means comprises;
a moving body mounted on a machine base so as to be moved in both the first and the second directions: and
a shooting device provided on the moving body for aiming at and shooting a target displayed in the game image, and
wherein the processor means changes a facing direction of at least one of the character and the virtual camera based on a facing direction of the shooting device.

14. The game system according to claim 11,
wherein the shooting device in mounted on the moving body so that a facing direction thereof is variable, and
wherein the processor means causes at least one of the character and the virtual camera to face the same facing direction as the shooting device.

15. The game system according to claim 12,
wherein the shooting device is mounted on the moving body so that a facing direction thereof in variable, and
wherein the processor means causes at least one of the character and the virtual camera to face the same facing direction as the shooting device.

16. The game system according to claim 13,
wherein the shooting device is mounted on the moving body so that a facing direction thereof is variable, and
wherein the processor means causes at least one of the character and the virtual camera to face the same facing direction as the shooting device.

17. The game system according to claim 7, wherein the input means includes means for applying a restoring force to return the input means to a given neutral point.

18. The game system according to claim 11,
wherein the moving body comprises:
a first slide portion which slides on the machine base in any one of the first and the second directions; and
a second slide portion which slides on the first slide portion in the other one of the first and the second directions,
wherein the input means comprises means for applying a restoring force to return the first and the second slide portions to a given neutral point, and
wherein the shooting device is mounted on the second slide portion.

19. The game system according to claim 12,
wherein the moving body comprises:
a first slide portion which slides on the machine base in any one of the first and the second directions; and
a second slide portion which slides on the first slide portion in the other one of the first and the second directions,
wherein the input means comprises means for applying a restoring force to return the first and the second slide portions to a given neutral point, and
wherein the shooting device is mounted on the second slide portion.

* * * * *